No. 703,226. Patented June 24, 1902.
L. P. BISSELL & J. SULLIVAN.
TOBACCO SIZING DEVICE.
(Application filed Nov. 26, 1901.)
(No Model.) 2 Sheets—Sheet 1.

No. 703,226. Patented June 24, 1902.
L. P. BISSELL & J. SULLIVAN.
TOBACCO SIZING DEVICE.
(Application filed Nov. 26, 1901.)
(No Model.) 2 Sheets—Sheet 2.
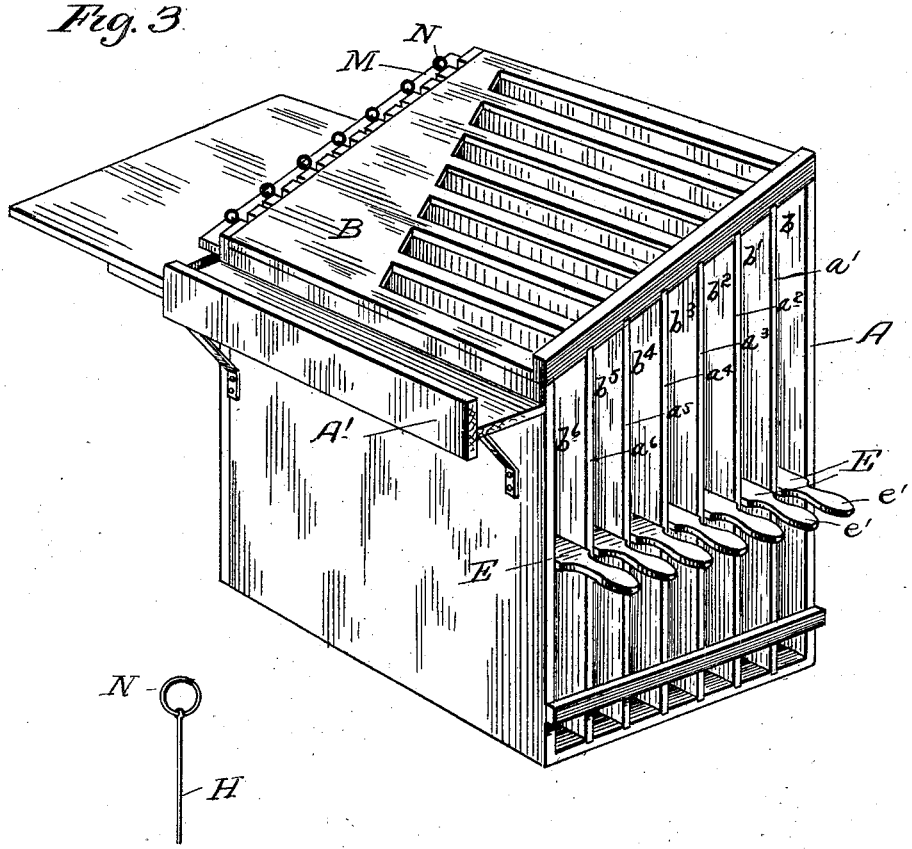
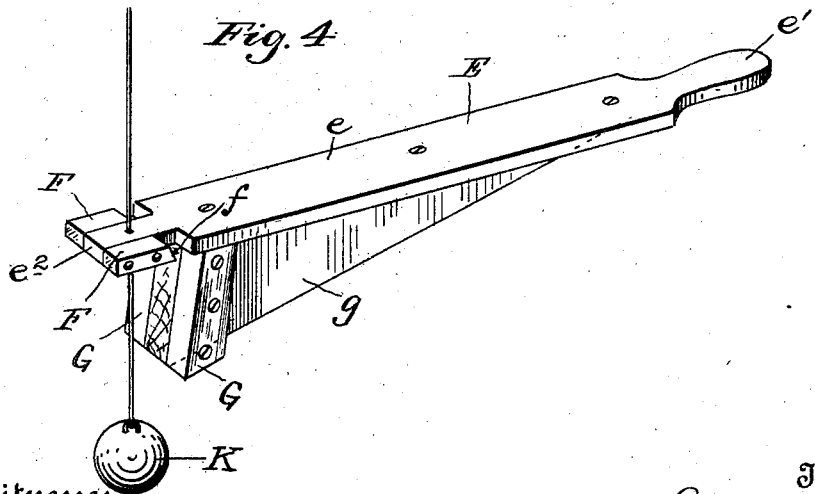
Witnesses
C. F. Kilgore
D. Krumendahl
Inventors
L. P. Bissell and
J. Sullivan
by Leonard Stad
Attorneys
THE NORRIS PETERS CO., PHOTO-LITHO., WASHINGTON, D. C.

UNITED STATES PATENT OFFICE.

LEAVITT P. BISSELL AND JOHN SULLIVAN, OF SUFFIELD, CONNECTICUT.

TOBACCO-SIZING DEVICE.

SPECIFICATION forming part of Letters Patent No. 703,226, dated June 24, 1902.

Application filed November 26, 1901. Serial No. 83,738. (No model.)

*To all whom it may concern:*

Be it known that we, LEAVITT P. BISSELL and JOHN SULLIVAN, of Suffield, in the county of Hartford, State of Connecticut, have invented certain new and useful Improvements in Tobacco-Sizing Devices, of which the following is a full, clear, and exact description, whereby any one skilled in the art may make and use the same.

The object of this invention is to produce a device of the class specified having features of novelty and advantage.

Figure 1:
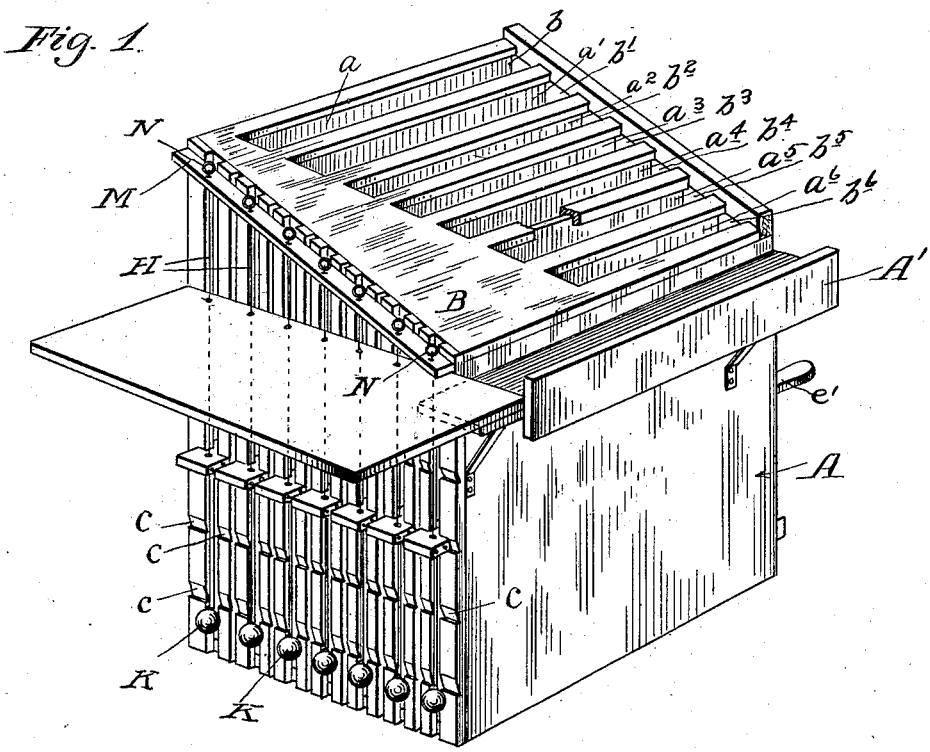
Figure 2:
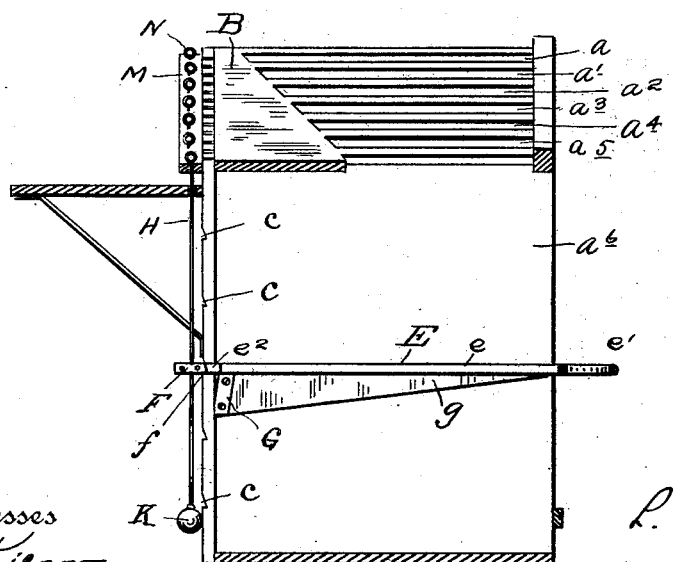

In the drawings, Figure 1 is a view in perspective of a sizing-box embodying our invention. Fig. 2 is a side view of the same in section. Fig. 3 is a perspective view of the sizing-box, showing the end opposite to that shown in Fig. 1. Fig. 4 is a detail view, on enlarged scale, of the false bottom or shelf.

Referring to the drawings, A denotes a box or crate open at the ends and top, it being divided into a series of compartments by the partitions $a'$ $a^2$ $a^3$ $a^4$ $a^5$ $a^6$, which extend from end to end of the box or crate. B is a cover therefor, having a series of slots $b$ $b'$ $b^2$ $b^3$ $b^4$ $b^5$ $b^6$, corresponding to the compartments of the box. The lengths of these slots vary, as shown in the drawings, the slot $b$ being the longest and the slot $b^6$ the shortest.

Devices of this class are used for sorting the leaves of the tobacco-plant. The operator stands at what may be termed the "front" of the box, to which is attached the shelf A'. He takes each leaf singly and, holding it at each end, runs it across the top of the crate until he finds the slot in the cover of the box which most nearly corresponds in length to the length of the leaf, when he drops the leaf into the compartment corresponding to that particular slot. As the leaves are dropped into the compartments it is the intention that they shall fall to the bottom in a flat or spread-out condition, and when a sufficient number of leaves have been piled up in any compartment they are removed therefrom and tied together in a bundle. Heretofore the bottom of the crate or box has constituted the bottom of these compartments, the box being proportionately the size of the box shown in the drawings annexed hereto, and the leaves in dropping to the bottom of the box were very apt to be twisted or doubled up or bruised, and they did not fall one upon the other in a flat or spread-out condition, which is essential. To obviate this difficulty, we provide an adjustable bottom or shelf E for each compartment, which may be raised to a point near the top of the box when the sorting is begun and may be lowered as the compartment is filled up until such time as the bundle is removed. These adjustable "bottoms" or "shelves," as they will be called, are alike in construction, and we will proceed to describe one of them in detail. This shelf E comprises a top plate $e$, extending beyond the box at one side to form a handle $e'$. At the other end the plate is formed into a tenon $e^2$, which projects beyond the end of the box between the partitions, which are of greater thickness at this end of the box than throughout the rest of their length to form shoulders, against which the shoulders on the plate $e$ abut. The ends of these partitions are notched, as at $c$ $c$. To each side of the tenon are secured what may be termed "cleats" F F, having their inner ends beveled toward their lower sides, as at $f$. This construction is practically the equivalent of making the plate $e$ of one breadth throughout and cutting the notches in each side of it, having one side of the notches beveled, as shown at $f$. Underneath this plate and secured to it are braces G, with their faces adjacent to the notches disposed at an acute angle to the plate $e$, as clearly shown in Figs. 2 and 4. Extending from this brace toward the handle end of the shelf is a stiffening or strengthening piece $g$, which permits of the shelf being entirely supported at one end only, which is a preferable construction. In operation the beveled sides $f$ of the cleats F engage the notches $c$ in the partitions, the braces G bear against the inner sides of the shoulder on the partitions, and thus support the shelf in substantially a horizontal plane. When the shelf is to be lowered, the handle end is raised, thus disengaging the beveled ends $f$ from the notches $c$ and permitting the shelf to be lowered to any desired position. For raising the shelves we provide a rod H, having a handle N at its upper end. This rod passes through a hole in the ledge M and through a hole in the tenon $e^2$ and has at its lower end a weight K, which normally keeps it in its lowermost position, with the handles N resting on the ledge M. To raise the shelf, the rod is pulled up until the weight K engages the under side of the shelf, when further raising of the rod will raise the shelf as much or as little as desired.

We have described herein one way of constructing a sizing-crate, having different compartments with adjustable shelves or bottoms for the compartments; but it is evident that modifications and alterations may be made in the construction without departing from the spirit of our invention, and we desire to include herein and in the following claims any and all such modifications.

We claim as our invention—

1. A sizing box or crate provided with a series of compartments having mouths of different lengths, in combination with shelves in the compartments adapted to be adjusted vertically to different points as desired, all substantially as described and for the purposes set forth.

2. A sizing box or crate provided with a series of compartments and having mouths of different lengths, in combination with a series of shelves for said compartments independent of one another and adapted to be adjusted vertically to different points as desired, all substantially as described.

3. A sizing box or crate provided with a series of compartments, a removable cover therefor having slots corresponding to said compartments, said slots being of different lengths, in combination with shelves in the compartments adapted to be adjusted vertically to different points as desired, said shelves being supported at one end only, substantially as described.

4. A sizing box or crate provided with a series of compartments having mouths of different lengths in combination with shelves in the compartments, means whereby they may be adjusted vertically to different points as desired, and means for raising said shelves, substantially as described and for the purposes set forth.

LEAVITT P. BISSELL.
JOHN SULLIVAN.

Witnesses:
S. R. SPENCER,
A. C. ALLEN.